United States Patent
Kawato

(10) Patent No.: US 9,537,422 B2
(45) Date of Patent: Jan. 3, 2017

(54) HIGH-FREQUENCY POWER SUPPLY APPARATUS FOR SUPPLYING HIGH-FREQUENCY POWER

(75) Inventor: Eizo Kawato, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 13/823,742

(22) PCT Filed: Sep. 22, 2010

(86) PCT No.: PCT/JP2010/066397
§ 371 (c)(1),
(2), (4) Date: Jun. 10, 2013

(87) PCT Pub. No.: WO2012/039035
PCT Pub. Date: Mar. 29, 2012

(65) Prior Publication Data
US 2013/0265810 A1    Oct. 10, 2013

(51) Int. Cl.
*H02M 3/335*   (2006.01)
*H02M 7/538*   (2007.01)
(Continued)

(52) U.S. Cl.
CPC .............. *H02M 7/537* (2013.01); *G05F 1/70* (2013.01); *H02M 3/335* (2013.01);
(Continued)

(58) Field of Classification Search
USPC .................. 315/101.21, 101.51, 209 R, 291, 294,315/247, 244, 276, 278, 297; 363/16, 17, 18, 363/19, 20, 21.01, 21.02, 23, 98, 132; 323/205–211, 218, 364, 365
See application file for complete search history.

(56) References Cited

U.S. PATENT DOCUMENTS 3,448,407 A    6/1969    Lankreijer,
4,001,725 A    1/1977    Rossnick
(Continued)

FOREIGN PATENT DOCUMENTS

JP    408308151 A  *  5/1995
JP    H11-323534       11/1999
(Continued)

OTHER PUBLICATIONS

NPL JP 408308151A Eng.*
(Continued)

*Primary Examiner* — Timothy J Dole
*Assistant Examiner* — Ishrat Jamali
(74) *Attorney, Agent, or Firm* — Jianq Chyun IP Office

(57) ABSTRACT

A high-frequency power supply apparatus for supplying high-frequency power to a load the impedance of which greatly fluctuates is provided, wherein a stable high-frequency current is always maintained without having overcurrent or overvoltage generated in a drive circuit thereof. In the high-frequency power supply apparatus, a constant-current conversion circuit is connected between an LCR series resonant circuit and a half-bridge drive circuit, high-frequency current of the LCR series resonant circuit is controlled by the voltage of the half-bridge drive circuit, and a constant-current function is applied to impedance variation of the load. Due to the constant-current conversion circuit, the gate of a MOSFET of the half-bridge drive circuit is driven with a parallel capacitor using a transformer inserted in the LCR series resonant circuit, and the phases of the high-frequency current of the LCR series resonant circuit and the output of the half-bridge drive circuit are maintained to be constant.

6 Claims, 5 Drawing Sheets

(51) Int. Cl.
    *G05F 1/70*     (2006.01)
    *H02M 7/537*     (2006.01)
    *H02M 7/5387*     (2007.01)
    *H05H 1/46*     (2006.01)
    *H02M 7/5383*     (2007.01)

(52) U.S. Cl.
    CPC ..... *H02M 7/5387* (2013.01); *H02M 7/53832* (2013.01); *H05H 1/46* (2013.01); *H05H 2001/4682* (2013.01); *Y02B 70/1441* (2013.01)

(56) References Cited

U.S. PATENT DOCUMENTS

| | | | |
|---|---|---|---|
| 4,873,471 A * | 10/1989 | Dean et al. | 315/308 |
| 5,030,889 A * | 7/1991 | El-Hamamsy et al. | H05B 41/00 315/200 R |
| 5,191,302 A | 3/1993 | Rossnick | |
| 5,383,019 A | 1/1995 | Farrell et al. | |
| 5,404,082 A * | 4/1995 | Hernandez et al. | 315/219 |
| 5,488,269 A * | 1/1996 | El-Hamamsy et al. | 315/307 |
| 2003/0142513 A1* | 7/2003 | Vinciarelli | H02J 1/102 363/17 |
| 2009/0129131 A1 | 5/2009 | Hosemans | |

FOREIGN PATENT DOCUMENTS

| | | |
|---|---|---|
| JP | 2005-094827 | 4/2005 |
| JP | 2009-136048 | 6/2009 |

OTHER PUBLICATIONS

"Written Opinion of the International Searching Authority (PCT/ISA/237)", mailed on Feb. 11, 2010, with English translation thereof, p. 1-p. 6.

"International Search Report (Form PCT/ISA/210)", published on Mar. 29, 2012, with English translation thereof, p. 1-p. 2.

* cited by examiner

HIGH-FREQUENCY POWER SUPPLY APPARATUS FOR SUPPLYING HIGH-FREQUENCY POWER

CROSS-REFERENCE TO RELATED APPLICATION

This application is a 371 application of an international PCT application serial no. PCT/JP2010/066397, filed on Sep. 22, 2010. The entirety of the above-mentioned patent application is hereby incorporated by reference herein and made a part of this specification.

TECHNICAL FIELD

The invention is related to a high-frequency power supply apparatus for supplying high-frequency power to a load whose impedance greatly varies. Particularly, the invention is suitable for a high-frequency power supply apparatus for generating and maintaining plasma, and is used in an analytical instruments using plasma, such as an inductively coupled plasma (ICP) emission spectrometer or the like.

BACKGROUND ART

In an inductively coupled plasma (ICP) emission spectrometer, plasma is generated and maintained by introducing a plasma-generating gas such as argon as well as an analysis sample into a plasma torch and supplying high-frequency power to an induction coil. An elemental composition of the sample is analyzed by measuring a light emission from sample atoms excited in the plasma by using a spectroscope or the like.

A high-frequency electromagnetic field is produced in a plasma-generation portion by a high-frequency current flowing through the induction coil, and the plasma is heated by induction current caused by acceleration of charged particles in the plasma. Since this induction current decreases magnetic fields formed by the induction coil, effective inductance of the induction coil decreases. Moreover, energy loss due to heating of the plasma provides a resistance component of impedance of the induction coil.

While the plasma is formed, impedance of the induction coil varies. A state of the plasma varies according to the plasma-generating gas, condition of the analysis sample, supplied power to the plasma, etc., and the impedance of the induction coil also varies.

A resonant circuit is formed by the induction coil and a capacitor to supply power to the plasma. This resonant circuit is driven by a high-frequency power supply that provides high-frequency power, for example, in a range of several 100 W to several kW at 27 MHz. Since an output impedance of a high-frequency power supply is designed to be 50Ω in general, a tuning circuit is arranged between the high-frequency power supply and the resonant circuit and is controlled so that the impedance seen from the high-frequency power supply side is 50Ω all the time. It is a common method that a vacuum variable capacitor in the tuning circuit is adjusted by using a motor or the like so that the reflected power from the tuning circuit becomes zero.

In this way, it is relatively easy to design a highly efficient high-frequency power supply under conditions of a constant resonant frequency and a constant load impedance. However, in the case that the load impedance varies, maintaining the optimum condition all the time by operating the tuning circuit requires a complicated control mechanism and costly parts, which has become a negative factor in application to industrial products.

A free-running method with changing frequency in response to the variation in the load impedance without using costly parts such as the vacuum variable capacitor is, for example, disclosed in Patent Document 1. In Patent Document 1, the frequency of the high-frequency power supply is changed by using a voltage controlled oscillator (VCO) so that the reflected power from the tuning circuit is minimized. Nonetheless, since variable elements such as the vacuum variable capacitor or the like are removed from the tuning circuit, variation in the resistance component of the induction coil cannot be coped with.

Because of this, a method of directly driving the resonant circuit without limiting the output impedance of the high-frequency power supply to 50Ω is also disclosed. It is possible to provide a cheap power source with high efficiency although the high-frequency power supply cannot be placed far from the induction coil by using a transmission line such as a coaxial cable or the like, and the high-frequency power supply has to be placed near the induction coil. Due to employment of a self oscillation method of automatically changing the frequency in response to the variation of the load impedance, it is possible to construct a simpler high-frequency power supply circuit eliminating a frequency control circuit and a tuning circuit.

A self-oscillating high-frequency power supply circuit in an induction heating apparatus is disclosed in Patent Document 2 where a portion of voltage of the resonant circuit is fed back to a metal-oxide-semiconductor field-effect transistor (MOSFET) switching element in the high-frequency power supply. Moreover, a method of using a vacuum tube as the switching element is disclosed in Patent Document 3, and a method of using a transistor as the switching element is disclosed in Patent Document 4. Further, in Patent Document 5, a method of driving one side of the resonant circuit with a half bridge and a method of driving two sides of the resonant circuit with a full bridge are disclosed. In Patent Document 2, a portion of voltage of the capacitor in the resonant circuit is used as a gate voltage of a MOSFET by transformer coupling. In Patent Document 5, a current in the resonant circuit is fed to a resistor by transformer coupling for use as a gate voltage of the MOSFET.

Among these methods, even when variation occurs in the load impedance, oscillation continues at a resonant frequency determined by the load impedance, the switching element such as the MOSFET or the like are driven automatically at the same frequency due to feedback from the resonant circuit, and a process such as phase control between the resonant circuit and the drive circuit is not required any more.

PRIOR-ART DOCUMENTS

Patent Documents

Patent Document 1: R. C. Farrell et al., U.S. Pat. No. 5,383,019
Patent Document 2: M. Rossnick, U.S. Pat. No. 5,191,302
Patent Document 3: W. Lankreijer, U.S. Pat. No. 3,448,407
Patent Document 4: M. Rossnick, U.S. Pat. No. 4,001,725
Patent Document 5: S. W. Hosemans, U.S. Pub. No. US 2009/0129131

DISCLOSURE OF INVENTION

Problems to be Solved by the Invention

As mentioned above, it has become possible to achieve a high-frequency power supply much cheaper than conventional high-frequency power supplies by utilizing the techniques in Patent Documents 2 to 5. By using a self oscillation method to automatically adjust the frequency in response to the variation in the load impedance, a phase between the resonant circuit and the drive circuit is always maintained in the optimum state without performing particular controls.

However, in the method in Patent Document 5, since the current of the resonant circuit flows through the resistor by transformer coupling and is used as the gate voltage of the MOSFET, power is lost by the resistor. Since a gate capacitance of a MOSFET with large output current is large, there is a problem that a phase of the gate voltage is delayed in order to charge the gate capacitance and switching loss in the MOSFET increases.

Moreover, when an analysis is continuously conducted by an ICP emission spectrometer, there may be cases that the plasma suddenly disappears depending on the condition of plasma-generating gas and the analysis sample. The resistance component of the load abruptly changes to a small value in such cases, and the MOSFET may be destroyed by excessive current flowing into the load. Although a mechanism of controlling a voltage of a direct current voltage source (DC power supply) in response to the variation in the load is equipped, it cannot prevent the excessive current with its slower response. Even when the MOSFET is not completely destroyed, damage of the MOSFET deteriorates performance of the apparatus.

The invention has been developed to solve the above-mentioned problem, and aims to provide a high-frequency power supply having a simple circuit constitution with a self oscillation method where a continuous oscillation sustains at a resonant frequency determined by the load impedance and operates stably even when the resistance component of the load abruptly changes to a small value.

Means for Solving the Problems

To solve the above-mentioned problem, a high-frequency power supply is provided. The high-frequency power supply comprises a direct current voltage source, one or more half-bridge drive circuits, a constant-current conversion circuit, and a series resonant circuit. The direct current voltage source controls voltage of the half-bridge drive circuit. The half-bridge drive circuit comprises at least one pair of semiconductor switching elements, a control terminal of each of the semiconductor switching elements is connected to a secondary winding of a transformer for switching alternately between an ON state and an OFF state. In the series resonant circuit, an induction coil, at least one capacitor and primary windings of the transformers are connected in series, and a sum of reactance of those elements becomes zero at a specific resonant frequency $\omega$. The constant-current conversion circuit is a T-type constant-current conversion circuit or a $\pi$-type constant-current conversion circuit at the specific resonant frequency $\omega$.

Moreover, in the high-frequency power supply with the T-type constant-current conversion circuit, at the resonant frequency $\omega$, a sum of reactance of elements in a loop formed at an input terminal side including a reactance element at the center is zero, and further, a sum of reactance of elements in a loop formed at an output terminal side including the reactance element at the center is zero.

In addition, in the high-frequency power supply with the $\pi$-type constant-current conversion circuit, at the resonant frequency $\omega$, a sum of reactance of elements in a loop formed at an input terminal side including a reactance element at the center is zero, and further, a sum of reactance of elements in a loop formed at an output terminal side including the reactance element at the center is zero.

Further, in the high-frequency power supply, a control terminal of each of the semiconductor switching elements is connected to the secondary winding of the transformer with a capacitor in parallel.

In addition, in the high-frequency power supply, the semiconductor switching element may be a MOSFET.

Further, in the high-frequency power supply, the direct current voltage source may have a mechanism of controlling a product of current and voltage to be constant.

Separate from the above-mentioned invention, the present application also provides a high-frequency power supply, comprising a direct current voltage source and a half-bridge drive circuit. The direct current voltage source controls voltage of the half-bridge drive circuit. The half-bridge drive circuit has at least one pair of semiconductor switching elements, and a control terminal of each of the semiconductor switching elements is connected to a secondary winding of a transformer for switching alternately between an ON state and an OFF state. A first loop is formed by a plurality of reactance elements at an output terminal of the half-bridge drive circuit. A second loop is formed by serially connecting a part of the plurality of reactance elements in the first loop, an induction coil, at least one capacitor and primary windings of the transformers. A sum of reactance of elements in the second loop becomes zero at a specific resonant frequency $\omega$, and further, a sum of reactance of elements in the first loop also becomes zero at the specific resonant frequency $\omega$.

Moreover, in the high-frequency power supply, the control terminal of each of the semiconductor switching elements may be connected to the secondary winding of the transformer with a capacitor in parallel.

In addition, in the high-frequency power supply, the semiconductor switching element may be a MOSFET.

Further, in the high-frequency power supply, the direct current voltage source may have a mechanism of controlling a product of current and voltage to be constant.

With respect to high frequency, since loss will become large when a transformer or the like is used in a power portion, methods such as push-pull are not employed, but power efficiency is improved by using half-bridge or full-bridge switching drive methods. In the half-bridge method, two switching elements are arranged in series between a positive pole and a negative pole of the DC power supply, and by making these two switching elements alternately in an ON state, a rectangular wave drive voltage is generated as an output at a connecting portion between the two switching elements. In the full-bridge method, two half-bridge drive circuits produce rectangular wave drive voltage outputs in reversed phases each other, and twice as large drive voltage is obtained. No matter which method is employed, the principle of operation is the same. Therefore the half-bridge method with a simple constitution consisting of fewer elements is selected, and an explanation will be given hereinafter only on the half-bridge drive circuit. Thinking that, in the full-bridge method, two terminals of a load circuit are connected respectively to output terminals of two half-bridge drive circuits with reverse phases, it is obvious that the following discussion is also applicable to the case of the full-bridge structure.

Firstly, the principle of the high-frequency power supply of the invention is explained based on FIG. 2. To prevent abrupt increase of current of the load in the case that the resistance component of the load abruptly decreases, it is optimal to employ a constant-current drive circuit. A constant-current conversion circuit 20 is arranged between a half-bridge drive circuit 10 and an LCR series resonant circuit 30. The LCR series resonant circuit 30 comprises an inductance component 31 of an induction coil, a resistance component 32 of the induction coil and a capacitance element 33. The inductance component 31 of the induction coil and the capacitance element 33 are series resonant at a certain resonant frequency ω. Accordingly, impedance of the LCR series resonant circuit 30 seen from the constant-current conversion circuit 20 becomes equivalent to a value R0 of the resistance component 32 of the induction coil. Here, an angular frequency ω obtained by multiplying a frequency f with 2π (i.e. ω=2πf) is simply called a frequency.

The constant-current conversion circuit 20 comprises reactance elements 21, 22 and 23 arranged in a T-shape. For example, when the reactance elements 21 and 23 are inductors, the reactance element 22 serves as a capacitor. Alternatively, when the reactance elements 21 and 23 are capacitors, the reactance element 22 serves as an inductor. Absolute values of reactance of the reactance elements 21, 22 and 23 are all made the same value X1 at the resonant frequency ω of the LCR series resonant circuit 30.

More generally, there are conditions in which, at the resonant frequency ω, a sum of reactance of elements in a loop formed at an input terminal side including the reactance element 22 at the center of the constant-current conversion circuit 20 (a path starting from the half-bridge drive circuit 10, through the reactance elements 21 and 22, and returning to the half-bridge drive circuit 10) is zero, and further, a sum of reactance of elements in a loop formed at an output terminal side including the reactance element 22 at the center (a path starting from the LCR series resonant circuit 30, through the reactance element 23 and 22, and returning to the LCR series resonant circuit 30) is also zero.

As another constitutional example, FIG. 3 shows a high-frequency power supply in which the constant-current conversion circuit 20 in FIG. 2 is replaced with a constant-current conversion circuit 27 comprising reactance elements 24, 25 and 26 arranged in a π-shape. For example, when the reactance element 25 is an inductor, the reactance elements 24 and 26 serve as capacitors. Alternatively, when the reactance element 25 is a capacitor, the reactance elements 24 and 26 serve as inductors. Absolute values of reactance of the reactance elements 24, 25 and 26 are all made the same value X1 at the resonant frequency ω of the LCR series resonant circuit 30.

More generally, there are conditions in which, at the resonant frequency ω, a sum of reactance of elements in a loop formed at an input terminal side including the reactance element 25 at the center of the constant-current conversion circuit 27 (a path starting from the half-bridge drive circuit 10, through the reactance elements 25 and 26, and returning to the half-bridge drive circuit 10) is zero, and further, a sum of reactance of elements in a loop formed at an output terminal side including the reactance element 25 at the center (a path starting from the LCR series resonant circuit 30, through the reactance element 25 and 24, and returning to the LCR series resonant circuit 30) is also zero.

The principle of operation in FIG. 3 is the same as that in FIG. 2. Therefore, the following explanation is based on the T-type constant-current conversion circuit in FIG. 2 having a simpler structure. The half-bridge drive circuit 10 serves to output a rectangular wave drive voltage at a certain resonant frequency ω according to feedback from the LCR series resonant circuit 30. As the load impedance for higher harmonic waves of to is sufficiently high, only a component of the frequency ω as a fundamental wave will drive the LCR series resonant circuit 30. Let a voltage of the fundamental wave (sine wave) of the drive voltage of the half-bridge drive circuit 10 be V1, and let a current thereof be I1. Moreover, let a voltage of the LCR series resonant circuit 30 be V0, and let a current thereof be I0. The following equations are deduced.

$$V1 = I0 \times (jX1) \qquad \text{[Equation 1]}$$

$$V0 = I1 \times (-jX1) \qquad \text{[Equation 2]}$$

$$V0/I0 = R0 \qquad \text{[Equation 3]}$$

$$V1/I1 = (X1 \times X1)/R0 \qquad \text{[Equation 4]}$$

From Equation 1, if the voltage V1 of the fundamental wave of the drive voltage of the half-bridge drive circuit 10 is constant, the current I0 flowing into the LCR series resonant circuit 30 will become constant. It is understood that the circuit in FIG. 2 or FIG. 3 functions as the constant-current conversion circuit. Originally, only the reactance elements 21 and 22 are required for a constant-current conversion. However, by adding the reactance element 23, the load impedance seen from the half-bridge drive circuit 10 becomes a resistance (X1×X1)/R0 as shown in Equation 4 when the impedance of the LCR series resonant circuit 30 becomes a resistance R0 as shown in Equation 3.

Hence, as the load impedance seen from the half-bridge drive circuit 10 is expressed with the resistance R0 of the LCR series resonant circuit 30 in the reciprocal form, the current I0 flowing into the induction coil can be controlled to be constant even when the plasma disappears because R0 decrease abruptly but the load impedance seen from the half-bridge drive circuit 10 increases conversely.

Supplied power to the plasma is equivalent to the power V0×I0 consumed by the resistance component 32 of the induction coil. From Equation 1 and Equation 2, the supplied power to the plasma will become equivalent to the power consumption V1×I1 of the half-bridge drive circuit 10. Accordingly, by controlling the product of voltage and current of the half-bridge drive circuit 10 to be constant, the supplied power to the plasma is maintained to be constant. Moreover, even if the resistance component 32 of the induction coil abruptly decreases, an output current of the half-bridge drive circuit 10 does not increase, and it is possible to proceed to a regeneration process of plasma in a safe way.

Although for convenience of explanation, the reactance elements shown in FIG. 2 are described as individual elements, it goes without saying that a real circuit element, except the induction coil, may be divided into a plurality of elements or combined into a single element as long as conditions for reactance values are met. For example, the reactance element 21 may be connected to an output line at the lower side of the half-bridge drive circuit 10 in the drawing, or may be divided into a plurality of elements to be arranged into the upper and lower output lines so that a sum of reactance values becomes X1.

Moreover, a structure using a single capacitor by combining the reactance element 23 and the capacitance element 33 is possible, and a structure dividing those into a plurality of capacitors and inductors is also possible. Further, these elements and the induction coil may be arranged in any order at the right side of the reactance element 22.

The required conditions of the circuit structure in FIG. 2 include: first, with respect to the second loop comprising the reactance element 22 at the center and a group of elements at the right side of the reactance element 22 at the center, a resonance condition at a certain resonant frequency ω is satisfied, namely, a sum of reactance values becomes zero; second, with respect to the first loop comprising the reactance element 22 at the center and a group of elements arranged between the reactance element 22 at the center and the half-bridge drive circuit 10, the resonance condition at the same resonant frequency ω is satisfied, and a sum of reactance values becomes zero.

So far, only the behaviors in the event that the resistance component 32 of the induction coil varies are explained. An explanation is given with respect to the behaviors in the event that the inductance component 31 of the induction coil varies from now on. Firstly, a circuit is configured so that the resonance condition is satisfied at a resonant frequency ω when plasma is not formed. Moreover, to maintain electric discharge stably, the half-bridge drive circuit 10 is configured so as to drive output automatically at the resonant frequency ω of the LCR series resonant circuit 30 according to the feedback from the LCR series resonant circuit 30.

Due to the ignition of the plasma or increase in the supplied power to the plasma, the inductance component 31 of the induction coil decreases. At this moment, a resonance frequency ω, to fulfill a resonance condition in the second loop comprising the reactance element 22 at the center and the group of elements at its right side, increases towards a high frequency side. For example, when the inductance value of the inductance component 31 decreases by 6%, the resonant frequency ω increases by approximately 3%. Then, the reactance values of the reactance element 21 and the reactance element 22 each varies by 3% in directions opposite each other. With respect to the first loop comprising the reactance element 22 at the center and the group of elements at its left towards the half-bridge drive circuit 10, a shift of approximately 6% is caused from the resonance condition. However, because the reactance value X1 of the reactance elements in the constant-current circuit are chosen to be a similar value with the resistance component R0 of the induction coil in the case of maximum power supplied to the plasma, the minimum value of the load impedance (X1×X1)/R0 seen from the half-bridge drive circuit 10 becomes similar value to X1. Practically, the value of X1 is set so that the load impedance (X1×X1)/R0 can be driven in operational range of voltage and current of the DC power supply.

Accordingly, due to the shift from the resonance condition, a phase error of the output of the half-bridge drive circuit 10 is approximately 6%, which does not have a great influence on circuit operation and switching loss.

Further, if two resonance conditions with respect to the first loop and the second loop are made in the maximum power supplied to the plasma, the load impedance (X1×X1)/R0 seen from the half-bridge drive circuit 10 becomes much greater than X1 in the case that the resistance component R0 becomes small, and the phase error caused by a shift of X1 by approximately 6% from the resonance condition becomes negligible.

Accordingly, even if there is an error of approximately 1% in the values of the circuit elements, there is no problem with a phase between the voltage of the LCR series resonant circuit 30 and the voltage of the half-bridge drive circuit 10. Since it operates stably even though the values of the circuit element vary to some extent due to temperature variation and so on, there is an advantage of configuring the apparatus by using cheaper elements.

Here, one example of a specific circuit parameter is shown. Although there are cases that the induction coil may be exchanged depending on analysis conditions, for example, the inductance is made L0=710 nH when the plasma is not formed, and the value of the resistance component is made R0=3.9Ω when the maximum power of 1.6 kW is supplied to the plasma. The resonant frequency is made ω=2#×27.12 MHz, and two 100 pF capacitors are arranged at two sides of the induction coil in replacement of the reactance element 23 and the capacitance element 33. A 1.5 nF capacitor is used as the reactance element 22, and a 23 nH inductor is used as the reactance element 21. At this moment, X0=121Ω and X1=3.9Ω. When the supplied power to the plasma is the maximum value of 1.6 kW, the minimum value of the load impedance (X1×X1)/R0 seen from the half-bridge drive circuit 10 becomes 3.9Ω, a value same as X1. At this moment, a maximum peak current of the induction coil becomes I0=28.6 A, and a 3.5 kV peak voltage arises across the two ends of the induction coil. The drive voltage of the fundamental wave of the half-bridge drive circuit 10 becomes V1=111.5V. Although an amplitude of the rectangular wave drive voltage becomes 2×111.5V× (π/4)=175V according to calculations, practically, the amplitude of the drive voltage has to be approximately 200V due to switching loss of the MOSFET and so on.

Next, the feedback method of the high-frequency power supply of the invention is explained. In the LCR series resonant circuit, to compensate for the power loss in the resistance R0, an excitation source becomes necessary in a part of the circuit. In the LCR series resonant circuit 30 in FIG. 2, the constant-current conversion circuit 20 plays a role of an excitation voltage source to excite the LCR series resonant circuit 30 with a voltage V0. As the inductance component 31 of the induction coil and the capacitance element 33 are series resonant at a certain resonant frequency ω, the impedance of the LCR series resonant circuit 30 is equal to the value R0 of the resistance component 32 of the induction coil, and phases of the voltage V0 for excitation and the voltage of the resistance component 32 of the induction coil are matched. On the other hand, the phases of the voltage V0 for excitation and the voltage of the inductance component 31 of the induction coil or the capacitance element 33 are shifted by 90°. Because of this, in Patent Document 5, a resistor is inserted in the resonant circuit to generate a feedback voltage having the same phase as the voltage of the resistance component 32 of the induction coil. Specifically, the resister is moved to the drive circuit by using a transformer, and is used to provide a gate voltage of the MOSFET.

In the high-frequency power supply of the invention, due to an effect of the constant-current conversion circuit 20, from Equation 2, the phase of the voltage V0 for excitation and the phase of the current I1 of the half-bridge drive circuit 10 are shifted by 90°. Moreover, from Equation 4, the phase of the current I1 and the phase of the voltage V1 of the half-bridge drive circuit 10 are matched when the resonance condition is satisfied; as previously mentioned, even when the state of the plasma is changed and the circuit parameters of the induction coil vary, shift of the phase may be negligible. Accordingly, the phase of the voltage V1 of the half-bridge drive circuit 10 and the phase of the current I1 of the half-bridge drive circuit 10 become the same, and also becomes the same as the phase of the voltages of the inductance component 31 of the induction coil or the voltages of the capacitance element 33. Because of this, in the high-frequency power supply of the invention, a capacitor is inserted in the LCR series resonant circuit 30, and the capacitor is moved to the half-bridge drive circuit 10 by using a transformer and is used as a gate voltage of the MOSFET. That is, the primary winding of the transformer is inserted in the resonant circuit, the secondary winding of the transformer is connected between the gate and the source electrodes of the MOSFET, and the capacitor is further connected in parallel therewith. With respect to two MOSFETs of the half-bridge drive circuit, the primary winding may be used in common, or individual transformers may also be used. In the event that individual transformers are used, they may be arranged at any positions in the right side of the reactance element 22. Practically, they are favorably arranged to minimize variation in the voltage between the primary winding and the secondary winding so that the influence of primary-to-secondary capacitive coupling is minimized.

It is very important for stable operation of the drive circuit to connect a capacitor in parallel between the gate and the source electrodes of the MOSFET in this way. As is clear from characteristics of gate charge with respect to the gate-source voltage of the MOSFET, it is necessary to inject a certain amount of charge into the gate of the MOSFET to switch the MOSFET from the OFF state to the ON state. When the gate is not sufficient, the MOSFET may not be completely switched to the ON state; if the gate charge is excessive, after the MOSFET is switched to the ON state and exceeds absolute maximum rating of voltage thereof. Because of this, under a condition that a capacitor capable of storing charge that is sufficiently larger than the gate charge for switching the MOSFET from the OFF state to the ON state is connected in parallel with gate-source electrodes, and this capacitor is capable of being driven with a proper amplitude, the MOSFET may be switched between the OFF state and the ON state stably without depending on non-linear gate charging characteristics thereof.

Moreover, in Patent Documents 2 and 5, to perform switching operations of the MOSFET between the OFF state and ON state with a small feedback voltage, a direct current bias voltage is supplied to the voltage of the secondary winding of the feedback transformer. However, there is a large temperature variation in a gate threshold voltage of the MOSFET, and it is difficult to maintain the bias voltage in the optimum state all the time. Moreover, when the bias voltage becomes too high, two MOSFETs forming the half bridge are made in the ON state at the same time, and a risk of destroying the elements arises.

In the high-frequency power supply of the invention, instead of using the bias circuit requiring external control, the capacitor is connected in parallel with the secondary winding of the transformer between the gate and the source electrodes. As a current of the LCR series resonant circuit 30 performs constant-current operations, a sine wave voltage having a constant amplitude is generated in the capacitor at the secondary side of the transformer. Even if the plasma suddenly disappears, there is no abrupt variation in the gate voltage of the MOSFET and no abrupt increase of switching loss resulting from the phase shift, and a cheap and safe feedback circuit may be formed.

In the half-bridge drive circuit 10 of the present application, two MOSFETs are further connected in parallel with drive MOSFETs for the aforementioned feedback drive to start oscillation in the LCR series resonant circuit 30. The two start-up MOSFETs are to perform the switching operations between ON-OFF state alternately for approximately 5-15 times, and provide oscillation energy to the LCR series resonant circuit 30. When the current I0 of the LCR series resonant circuit 30 increases to a certain extent, the gate voltage of drive MOSFETs for the feedback drive exceeds a threshold voltage so as to perform switching operations between ON-OFF state, the system moves into a state of self oscillation.

The start-up may be the same device as the drive MOSFET for a feedback circuit, or may be a smaller and cheaper MOSFET device since it is only used when starting oscillation.

The gate drive circuit of the start-up MOSFETs uses, for example, two MOSFET drivers, wherein the first MOSFET driver generates pulses of 10 cycles, and the second MOSFET driver generates pulses by delaying the output of the first MOSFET driver by a half cycle. The primary winding of the transformer for gate driving is connected between the outputs of the two MOSFET drivers, and the secondary winding is connected in parallel with the capacitor between the gate and the source electrodes of the start-up MOSFET. For example, when there is an error of 1% between the pulse frequency of the MOSFET driver and the resonant frequency $\omega$ of the LCR series resonant circuit 30, there will be an error of 15% for 15 cycles, which is a permissible extent if it is only used when starting oscillation. When the resonant frequency $\omega$ of the LCR series resonant circuit 30 varies by approximately 6% due to change of state of the plasma, there will be an error of 60% for 10 cycles, and the phase variation is too large. Accordingly, the pulse frequency of MOSFET driver is set to be consistent with the resonant frequency $\omega$ of the LCR series resonant circuit 30 when the plasma is not formed with an error of or less than 1%. Alternatively, the pulse frequency of MOSFET driver may be varied gradually around the resonant frequency $\omega$ until the self oscillation starts in the LCR series resonant circuit 30.

After the self oscillation starts, the oscillation is automatically maintained even when the plasma is ignited by an igniter circuit and the impedance of the induction coil is varied due to heating of the plasma.

Since the current I0 of the LCR series resonant circuit 30 is in proportion to the voltage V1 of the half-bridge drive circuit 10, the current I1 of the half-bridge drive circuit 10, which is in proportion to the voltage V0 occurring at the resistance component 32 of the induction coil, is controlled for controlling the power supplied to the plasma. Specifically, the voltage V1 of the half-bridge drive circuit 10 is controlled so that the product of the voltage V1 and the current I1 of the half-bridge drive circuit 10 becomes constant. Since the oscillation is maintained stably by the feedback circuit, a response speed of the power control circuit does not need high speed. Moreover, to stop oscillation, the voltage V1 of the half-bridge drive circuit 10 is made small so that the current I0 of the LCR series resonant circuit 30 becomes sufficiently small. When the gate voltage of the feedback drive MOSFET is unable to exceed the threshold voltage, the drive MOSFET is not capable of being switched to the ON state, and the oscillation stops.

Effects of the Invention

As mentioned above, according to the high-frequency power supply of the invention, by using the constant-current conversion circuit, for the abrupt variations in the resistance and inductance of the induction coil occurred when the plasma suddenly disappears and so on, over-current from the output of the half-bridge drive circuit may be automatically avoided without intervention of a control circuit. Moreover, by using the feedback circuit with parallel capacitors in the gate-source electrodes of the MOSFETs in the half-bridge drive circuit, the gate voltage may be kept stable without causing overvoltage, and stable oscillation may be maintained. Since the control circuit that requires a high-speed response is not used, it is possible to construct a cheap, simple and safe high-frequency power supply.

BEST MODE FOR CARRYING OUT THE INVENTION

Below is an explanation for a high-frequency power supply apparatus used in an inductively coupled plasma (ICP) emission spectrometer and serves as one example of the high-frequency power supply of the invention.

Figure 1:
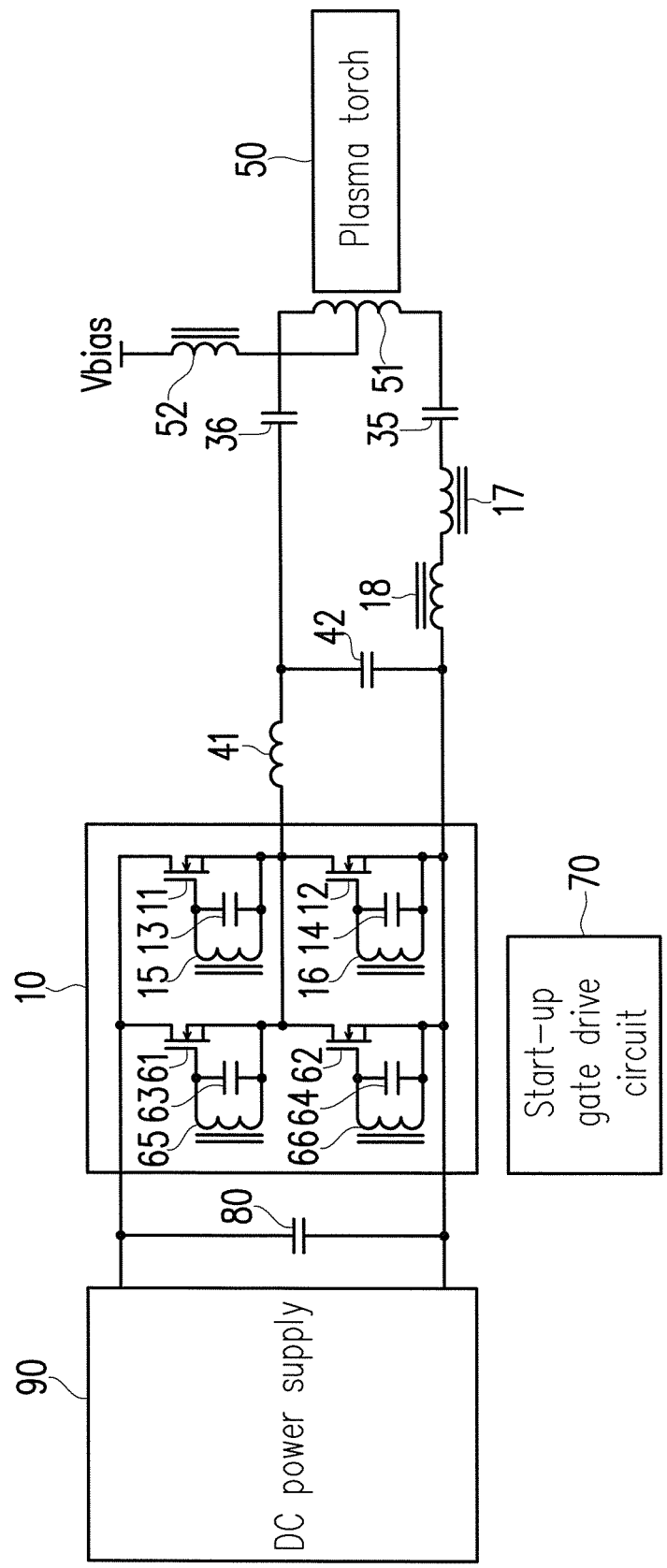
FIG. 1 is an embodiment of a high-frequency power supply related to the invention.

FIG. 1 is the high-frequency power supply of the ICP emission spectrometer. A high-frequency current flows through an induction coil 51, causing plasma to occur in a plasma torch 50 normally arranged coaxially within the induction coil 51. A choke coil 52 is connected to a midpoint of the induction coil, and a DC bias voltage Vbias is applied thereto. Two capacitors 35 and 36 having the same values are arranged at two ends of the induction coil 51 in series with the induction coil 51. Moreover, primary coils 17 and 18 of transformers for feedback purpose are further arranged in series. A capacitor 42 of a constant-current conversion circuit is connected in series with these serially connected induction coil 51, capacitors 35 and 36, and primary coils 17 and 18 of the transformers for feedback purpose, to form a second loop. An inductor 41 of the constant-current conversion circuit is connected between the capacitor 42 of the constant-current conversion circuit and the half-bridge drive circuit 10 to form a first loop.

A drive MOSFET 12 is connected between output terminals of the half-bridge drive circuit 10. A source electrode of another drive MOSFET 11 is connected to a drain electrode of the drive MOSFET 12. A bypass capacitor 80 and a DC power supply 90 are connected between a drain electrode of the drive MOSFET 11 and a source electrode of the drive MOSFET 12.

Between the gate and the source electrodes of the drive MOSFETs 11 and 12, capacitors 13 and 14 and secondary coils 15 and 16 of the transformers for feedback (referring to feedback transformer) are respectively arranged. The secondary coils 15 and 16 of the feedback transformers are coupled respectively to the primary coils 17 and 18 of the feedback transformers.

In the half-bridge drive circuit 10, a start-up circuit comprising start-up MOSFETs 61 and 62 is connected in parallel with a drive circuit comprising the drive MOSFETs 11 and 12. Same as the drive circuit, between the gate and the source electrodes of the start-up MOSFETs 61 and 62, capacitors 63 and 64 and secondary coils 65 and 66 of start-up transformers are respectively arranged. Primary coils corresponding to the secondary coils 65 and 66 of the start-up transformers are arranged within a start-up gate driver circuit 70.

A more detailed explanation for the circuits of the high-frequency power supply in FIG. 1 is given below. The constant-current conversion circuit used in FIG. 1 is equivalent to the T-type constant-current conversion circuit in FIG. 2. The inductor 41 corresponds to the reactance element 21, and the capacitor 42 corresponds to the reactance element 22. The reactance element 23 is coupled to the reactance element 33 to form a capacitor. The capacitor is further divided into the two capacitors 35 and 36 that are connected respectively to two ends of the induction coil 51. A high voltage generated across the two ends of the induction coil 51 due to the high-frequency current flowing through the LCR series resonant circuit is symmetrically divided into positive and negative voltages by the capacitors 35 and 36. Because of this, a potential of plasma generated within the plasma torch and electrostatically coupled to the induction coil becomes stable due to cancelation of influence from the two ends. The DC bias voltage Vbias is applied to the induction coil 51 through the choke coil 52. If the high frequency can be sufficiently blocked, the choke coil 52 may be connected to either end of the induction coil 51 instead of the midpoint thereof. Moreover, a resistance instead of the choke coil 52 may be used.

Moreover, the primary coils 17 and 18 of the feedback transformers may be arranged at any positions of the second loop at the right side of the capacitor 42. However, normally, they are arranged away from the induction coil 51 and the capacitors 35 and 36 where high voltages are generated.

Figure 2:
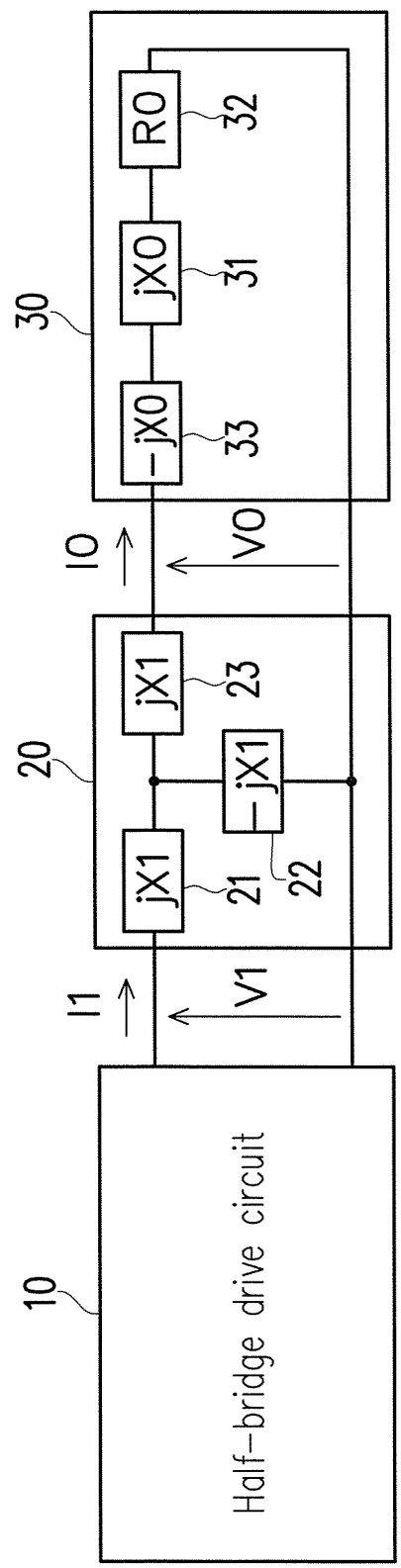
FIG. 2 is an exemplary structure of the high-frequency power supply of the invention using a T-type constant-current conversion circuit.

In this way, using the T-type constant-current conversion circuit, the group of reactance elements in the constant-current conversion circuit 20 and the LCR series resonant circuit 30, which are serially connected as shown in FIG. 2, are arranged at any positions by combining and dividing each other. In accordance with that a sum of reactance values of the group of reactance elements 22, 23, 33 and 31 in FIG. 2 becomes zero, a resonant frequency ω of the LCR resonant circuit 30 is determined so that a sum of reactance values in the second loop formed by the capacitor 42 and the group of elements at its right side becomes zero. It should be mentioned that the primary coils 17 and 18 of the feedback transformers are coupled to the secondary coils 15 and 16, respectively, and act as capacitors connected to them equivalent to sums of the capacitors 13 and 14 and gate-source capacitances of the MOSFETs 11 and 12, respectively.

The inductor 41 may be divided into a plurality of reactance elements, and moreover, may be arranged at any position between the capacitor 42 and the half-bridge drive circuit 10. Further, the inductor 41 and the capacitor 42 may be replaced by a capacitor and an inductor, respectively. In accordance with that the sum of reactance values of reactance elements 21 and 22 becomes zero in FIG. 2, reactance values of the inductor 41 and the capacitor 42 in the first loop are selected so that sum of them becomes zero at the resonant frequency ω of the LCR resonant circuit 30.

The primary coils 17 and 18 of the feedback transformers are connected in reversed polarity so that the drive MOSFETs 11 and 12 are in the ON state alternately.

The bypass capacitor 80 supplies current for a drive output of the half-bridge drive circuit 10, and has a sufficient capacitance for maintaining a constant DC voltage until the DC power supply 90 responds when the load impedance abruptly varies.

The DC power supply 90 settles the DC voltage to the half-bridge drive circuit 10, and determines a high-frequency current I0 flowing through the induction coil 51. When a state of the plasma changes and a resistance component R0 of the induction coil 51 varies, loss in the plasma varies, the output current I1 of the half-bridge drive circuit 10 varies, and an output current of the DC power supply 90 also varies. In order to keep the loss in the plasma constant, a control mechanism to change the DC voltage is implemented in the DC power supply 90, and the product of the DC voltage and the output current is maintained at a preset power value. Alternatively, such a control circuit may be arranged separately.

Figure 4:
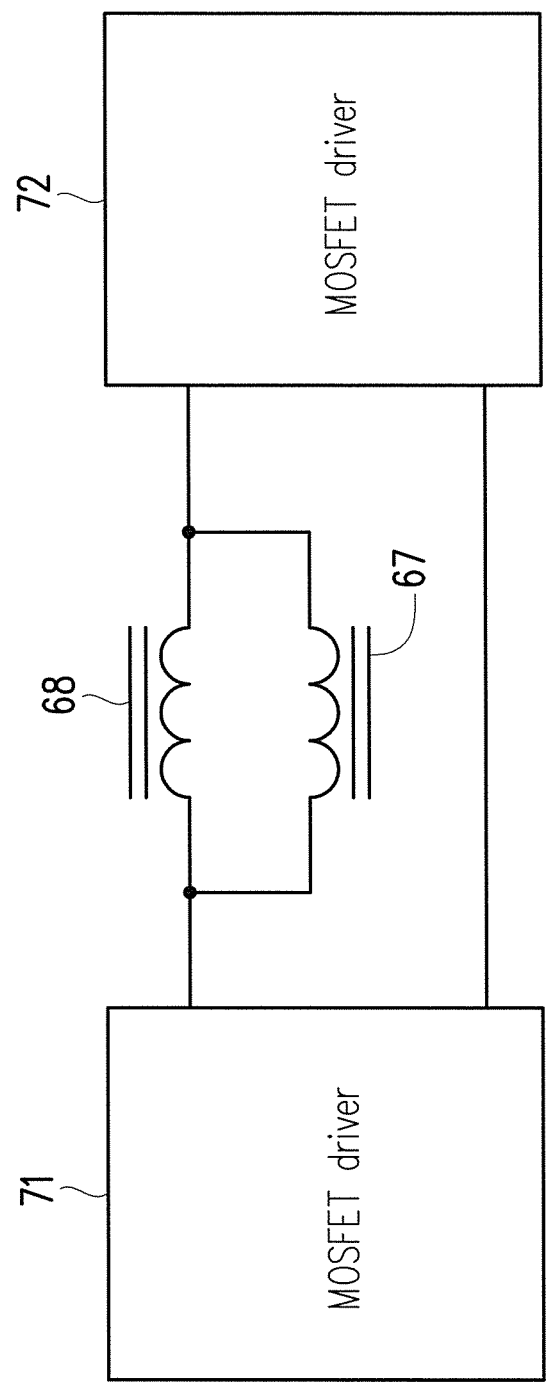
FIG. 4 is an embodiment of a gate driver for start-up.

FIG. 4 is one exemplary structure of the start-up gate driver circuit 70. Two MOSFET drivers 71 and 72 are disposed, and between output terminals thereof, primary coils 67 and 68 of start-up transformers are connected with reversed polarities to make the start-up MOSFETs 61 and 62 in the ON state alternately. A control circuit, that is not illustrated, switches one MOSFET driver 71 between the ON state and OFF state, for example, during 15 cycles at the resonant frequency ω of the LCR resonant circuit when the plasma is not formed. The other MOSFET driver 72 generates the same output but with a delay of a half cycle from the output of the MOSFET driver 71. As a result, positive and negative pulses are produced during the 15 cycles for driving the start-up MOSFETs 61 and 62 through the start-up transformers. Because the frequency of the start-up gate driver circuit 70 is preset at the resonant frequency ω of the LCR series resonant circuit when the plasma is not formed, time lag between the timing of ON-OFF of the start-up MOSFETs 61 and 62 and the timing of ON-OFF of the drive MOSFETs 11 and 12 driven by feedback will not become large during the 15 cycles of start-up.

Next, an explanation is given for a series of operations from the start to the stop of the oscillation of the LCR series resonant circuit. Before the plasma is generated, firstly, it is necessary to start the oscillation of the LCR resonant circuit. When oscillation is not started, voltage is not supplied between the gate and the source electrodes of the drive MOSFETs 11 and 12, and the start-up gate driver circuit 70 is used to drive the start-up MOSFETs 61 and 62 for start-up. Once the start-up MOSFETs 61 and 62 start driving the output terminals of the half-bridge drive circuit 10, the high-frequency current in the LCR series resonant circuit reaches a certain level at approximately 5-10 cycles. At this moment, sufficient feedback voltage are generated between the gate and the source electrodes of the drive MOSFETs 11 and 12 so that the oscillation may be maintained continuously even if the drive of the start-up MOSFETs 61 and 62 by the start-up gate driver circuit 70 is stopped. At this moment, the resistance component R0 of the induction coil 51 has a minimum value. The resistance value is approximately 0.30 due to circuit elements, surface resistance of patterns, etc.

When oscillation is maintained in the LCR series resonant circuit, a high voltage is generated at an igniter electrode (not illustrated) arranged close to the plasma torch 50, producing charged particles within the plasma torch 50. When the plasma gas such as argon or the like is kept in proper conditions, the charged particles are accelerated by the electromagnetic field generated by the induction coil 51, and cause further ionization. Finally, density of the charged particles is increased and the plasma is established in the plasma torch 50. Thus, after the ignition of plasma is completed, energy loss due to heating of the plasma appears equivalently as an increase in the resistance component R0 of the induction coil.

Before the ignition of the plasma, the DC voltage of the DC power supply 90 may be set in advance based on a predicted value of the high-frequency current I0 after the plasma is ignited. To make the ignition at high speed, a higher high-frequency current I0 may also be set in advance as a standard. After the output current of the DC power supply 90 increases and the ignition of plasma is confirmed, the control of the DC power supply 90 is switched to a mode where the product of the DC voltage and the output current is constant. Corresponding to that the resistance component R0 of the induction coil 51 slowly varies according to the change of the plasma condition, the DC voltage of the DC power supply 90 is controlled to be a proper value so as to maintain the supplied power to the plasma constant.

When changing the supplied power to the plasma, control parameters of the DC power supply 90 is set to an expected power value, and the DC voltage may be automatically controlled so that the supplied power becomes a target power value.

To stop the plasma, the oscillation of the LCR series resonant circuit is stopped. When the DC voltage of the DC power supply 90 is set to zero or a very low value, the high-frequency current flowing into the induction coil 51 is decreased in proportion thereto, the feedback voltages between the gate and the source electrodes of the drive MOSFETs 11 and 12 become insufficient for switching the MOSFETs to the ON state, and the oscillation of the LCR series resonant circuit will stop. Accordingly, energy supplied to the plasma by the induction coil 51 vanishes, and the plasma immediately stops.

Figure 3:
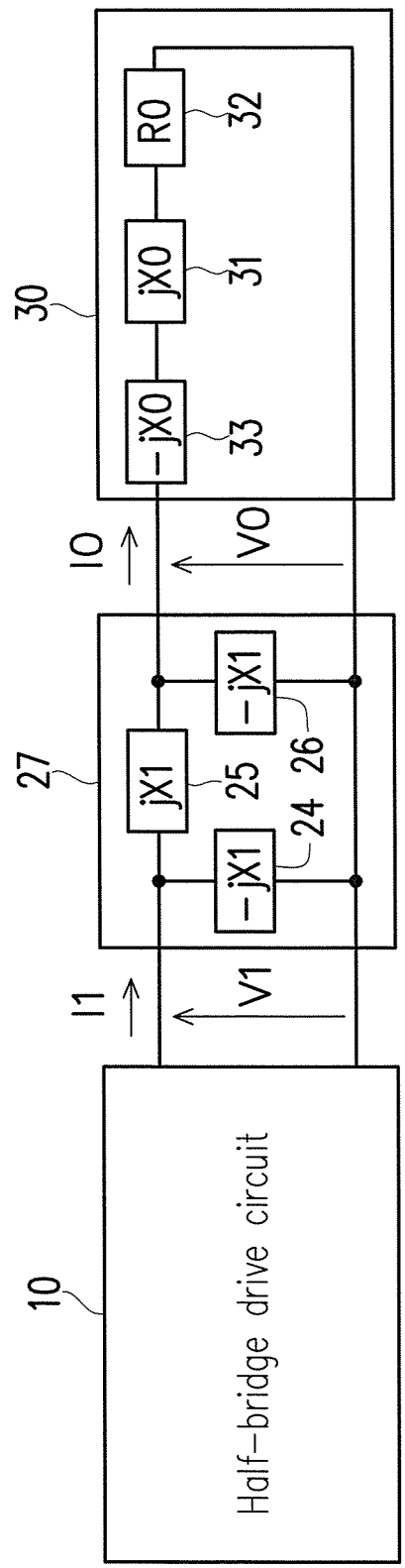
FIG. 3 is an exemplary structure of the high-frequency power supply of the invention using a π-type constant-current conversion circuit.
Figure 5:
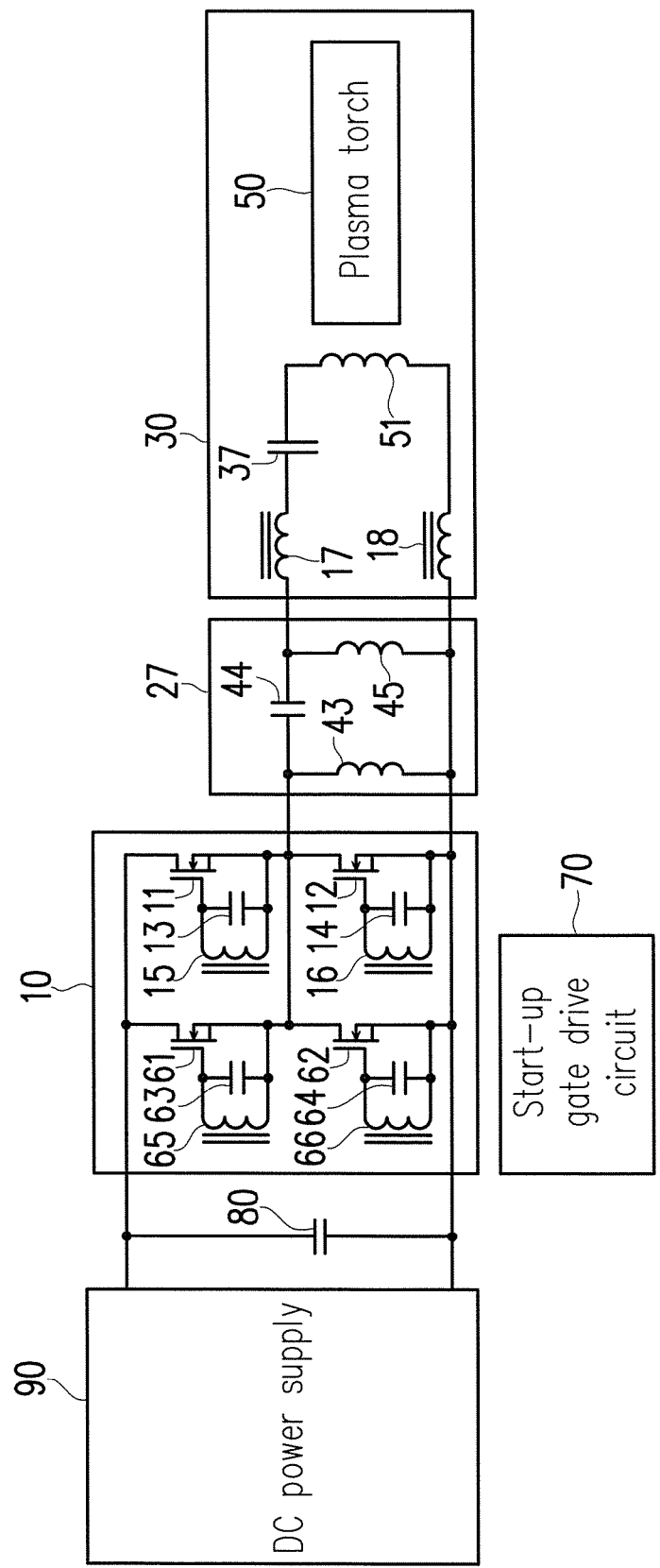
FIG. 5 is another embodiment of the high-frequency power supply related to the invention.

Next, an embodiment of the high-frequency power supply using a π-type constant-current conversion circuit based on the structure of FIG. 3 is shown in FIG. 5. The same numerals are used for components corresponding to FIG. 1 and FIG. 3. A π-type constant-current conversion circuit 27 comprises two inductors 43, 45 and a capacitor 44. It is obvious that inductors and capacitors may be exchanged with each other. The LCR series resonant circuit 30 comprises the induction coil 51 and one capacitor 37. In the present embodiment, a DC bias circuit is unnecessary. Moreover, the primary coil 17 of the feedback transformer has been shown in another arrangement example.

As circuits apparently different as shown in FIG. 1 and FIG. 5, the structure is common to both in which the LCR series resonant circuit 30, constructing the second loop where a resonance condition is achieved when the sum of reactance values at the resonant frequency ω becomes zero, is connected to the half-bridge drive circuit 10 by using the constant-current conversion circuit being the T-type constant-current conversion circuit 20 or the π-type constant-current conversion circuit 27 at this resonant frequency ω.

All of the reactance elements may be changed by such as coupling and division or the like based on an equivalent transformation.

Moreover, even if the input terminals of the constant-current conversion circuit are connected not to one half-bridge drive circuit but to two half-bridge circuits operating with reverse phases to construct a full-bridge circuit structure, the principle of operation is the same.

From the above results, in the above-mentioned embodiments of the high-frequency power supply using the constant-current conversion circuit, in case of abrupt variations in the resistance value and reactance value of the induction coil that occur when the plasma suddenly disappears or the like, overcurrent of the half-bridge drive circuit is automatically avoided without participation of a control circuit. Moreover, by using the feedback circuit in which the capacitors are arranged in parallel with the secondary coils of the feedback transformers, there is no occurrence of overvoltage at the gate voltage of the MOSFETs of the half-bridge drive circuit, and safe oscillation may be maintained.

As a result, since the control circuit that requires a high-speed response is not used, a cheap, simple and safe high-frequency power supply may be constructed.

The aforementioned embodiments are merely one example of the invention, and any change or amendment appropriately made within the spirit of the invention will be obviously included in the invention.

What is claimed is:

1. A high-frequency power supply, comprising:
a direct current voltage source;
at least one half-bridge drive circuit;
a constant-current conversion circuit, and
a series resonant circuit,
wherein the direct current voltage source controls voltage of the at least one half-bridge drive circuit; the at least one half-bridge drive circuit comprises at least one pair of semiconductor switching elements, a control terminal of each of the semiconductor switching elements is connected to a secondary winding of a feedback transformer for switching alternately between an ON state and an OFF state, wherein the two secondary windings respectively connected to two primary windings of the feedback transformer with connection to the constant-current conversion circuit, the control terminal of each of the semiconductor switching elements is directly connected to a capacitor and the secondary winding of the feedback transformer, the semiconductor switching element is a metal-oxide-semiconductor field-effect transistor (MOSFET), and the capacitor is connected in parallel with the secondary winding of the transformer between the control terminal and a source terminal of the each of the semiconductor switching elements;
the series resonant circuit comprises an induction coil, at least one capacitor and primary windings of the transformers connected in series, and a sum of reactance at a specific resonant frequency $\omega$ becomes zero; and
the constant-current conversion circuit is a T-type constant-current conversion circuit or a $\pi$-type constant-current conversion circuit at the specific resonant frequency $\omega$.

2. The high-frequency power supply as described in claim 1, wherein in the T-type constant-current conversion circuit, at the specific resonant frequency $\omega$, a sum of reactance of elements in a loop formed at an input terminal side including a reactance element at the center becomes zero, and further, a sum of reactance of elements in a loop formed at an output terminal side including the reactance element at the center becomes zero.

3. The high-frequency power supply as described in claim 1, wherein in the $\pi$-type constant-current conversion circuit, at the specific resonant frequency $\omega$, a sum of reactance of elements in a loop formed at an input terminal side including a reactance element at the center becomes zero, and further, a sum of reactance of elements in a loop formed at an output terminal side including the reactance element at the center becomes zero.

4. The high-frequency power supply as described in claim 1, wherein the direct current voltage source comprises a mechanism of controlling a product of current and voltage thereof to be constant.

5. A high-frequency power supply, comprising:
a direct current voltage source; and
a half-bridge drive circuit,
wherein the direct current voltage source controls voltage of the half-bridge drive circuit;
the half-bridge drive circuit comprises at least one pair of semiconductor switching elements, and a control terminal of each of the semiconductor switching elements is connected to a secondary winding of a feedback transformer for switching alternately between an ON state and an OFF state, wherein the two secondary windings respectively connected to two primary windings of the feedback transformer with connection to the constant-current conversion circuit, the control terminal of each of the semiconductor switching elements is directly connected to a capacitor and the secondary winding of the feedback transformer, the semiconductor switching element is a metal-oxide-semiconductor field-effect transistor (MOSFET), and the capacitor is connected in parallel with the secondary winding of the transformer between the control terminal and a source terminal of the each of the semiconductor switching elements;
a first loop comprising a plurality of reactance elements is formed at an output terminal of the half-bridge drive circuit;
a second loop is formed by serially connecting a part of the plurality of reactance elements in the first loop, an induction coil, at least one capacitor and primary windings of the transformers; and
wherein a sum of reactance of elements in the second loop becomes zero at a specific resonant frequency $\omega$, and further, a sum of reactance of elements in the first loop becomes zero at the specific resonant frequency $\omega$.

6. The high-frequency power supply as described in claim 5, wherein the direct current voltage source comprises a mechanism of controlling a product of current and voltage thereof to be constant.

* * * * *